United States Patent [19]

Pfarrawaller

[11] 4,083,513

[45] Apr. 11, 1978

[54] WARP BEAM

[75] Inventor: Erwin Pfarrawaller, Winterthur, Switzerland

[73] Assignee: Sulzer Brothers Limited, Winterthur, Switzerland

[21] Appl. No.: 630,952

[22] Filed: Nov. 12, 1975

[30] Foreign Application Priority Data

Dec. 5, 1974 Switzerland ............... 16148/74

[51] Int. Cl.² ........................... B65H 75/14
[52] U.S. Cl. ........................... 242/118.6; 242/118.5;
242/118.62; 403/320; 403/343
[58] Field of Search ............ 242/118.5, 118.6, 118.61,
242/118.62, 118.4, 77, 77.4; 285/382.4;
403/320, 343, 277

[56] References Cited

U.S. PATENT DOCUMENTS

| 195,060 | 9/1877 | Wait | 242/118.62 |
|---|---|---|---|
| 587,546 | 8/1897 | Dillenburg | 285/382.4 X |
| 2,496,402 | 2/1950 | McVeigh et al. | 242/118.5 |
| 2,550,511 | 4/1951 | Williams | 242/118.5 X |
| 3,853,287 | 12/1974 | Scholze et al. | 242/118.5 |

Primary Examiner—George F. Mautz
Attorney, Agent, or Firm—Kenyon & Kenyon, Reilly, Carr & Chapin

[57] ABSTRACT

The warp beam is made of at least two telescoping parts with a clamping means pressing the parts together radially from within the area of overlap. The clamping means includes a wedge-shaped clamping plate which is pressed against a wedge on the end of the innermost part of the warp beam by means of a partially threaded spindle which is rotatably mounted within the interior of the innermost part.

10 Claims, 4 Drawing Figures

WARP BEAM

This invention relates to a warp beam, and particularly, to a multi-component warp beam.

Warp beams have been known to be made with a tube for the winding on of warp yarns for use in textile machinery such as weaving machines. These tubes have been made of at least two telescoping engaging parts which are generally located one within the other and secured together. In some instances, for example as described in German Offenlegungsschrift No. 2,046,995, (U.S. Pat. No. 3,853,287), the telescopic members of the warp beam are located by a nut which has a preferably cylindrical contour, is disposed on the periphery of the inner member and can be screwed and clamped against the end face of the outer beam member. However, tightening the nut is often difficult, a special tool being required which can be introduced into recesses or apertures in the nut end face. In addition, one of the warp beam flanges must be removed. The beam members and/or flanges may also shift again while they are actually being located, e.g. because of the outer beam member rotating or the complete beam may become slightly curved because of inaccuracies in the nut.

Accordingly, it is an object of the invention to provide a multi-component warp beam which can be easily assembled.

It is another object of the invention to be able to exert a relatively large clamping force on two telescoping parts of a warp beam to secure the parts together.

It is another object of the invention to reduce the possibility of relative rotation between two interengaging telescoping parts of a multi-component warp beam.

Briefly, the invention provides a warp beam made of at least two telescopically engaging parts which are disposed in overlapping relation to define a common area of overlap and clamping means pressing these parts together radially within the area of overlap. The clamping means includes at least one wedge-shaped clamping element and means for moving the clamping element to expand the innermost telescoping part radially against the outer part.

The means for moving the clamping element includes a spindle which is rotatably mounted within the telescoping parts and has a terminal end passing into a recess at one end of the innermost beam part so that the spindle can be rotated by a suitable tool. Rotation of the spindle causes the clamping element to move into or away from the innermost telescoping part to increase or to release the clamping force.

Since the clamping means is operative radially and from the inside, the inner beam part can be expanded substantially over its entire periphery and over a considerable part of its axial extent and brought into bearing engagement with the inside periphery of the outer beam part. Considerable pressure can be applied and the warp beam parts can be secured very strongly against relative rotation.

Advantageously, the wedge-shaped clamping element can be in the form of a substantially radially disposed plate which bears on the inside periphery of the associated warp beam tube part and which can be tightened by means of the spindle against a matching wedge disposed on the inside periphery of the warp beam tube part.

These and other objects and advantages of the invention will become more apparent from the following detailed description and appended claims taken in conjunction with the accompanying drawings in which:

Figure 1:
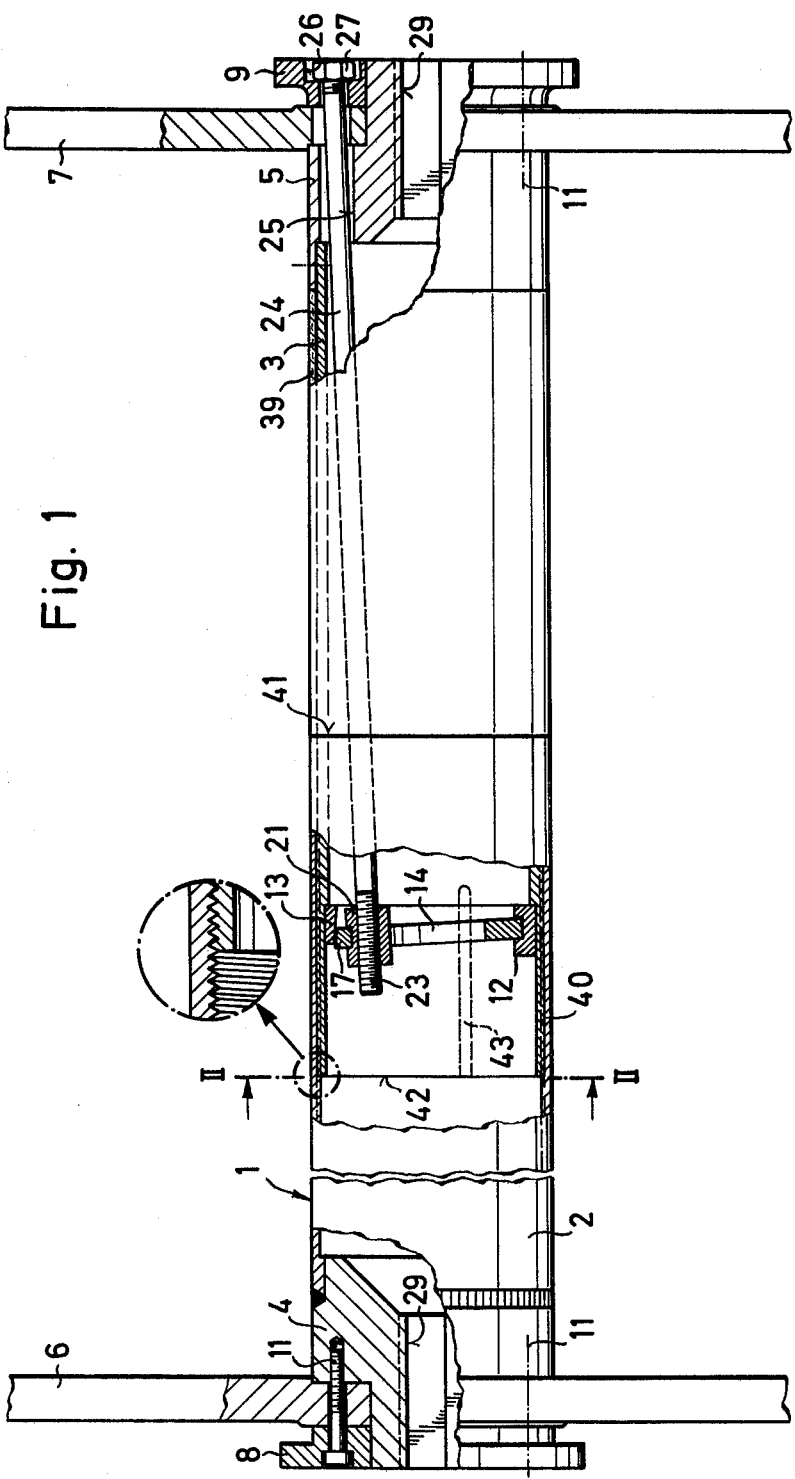
FIG. 1 illustrates a cross-sectional view, partly in elevation, taken on line I—I of FIG. 2.

Referring to FIG. 1, the warp beam 1 is made of two telescopically engaging elongated rigid tubular parts of members 2, 3 which are screwed together into threaded engagement via a screwthreading 40. Each of the warp beam parts 2, 3 has an end member 4, 5 and flange 6, 7 secured to the respective end as by welding. Also, co-rotating bearing elements or flanges 8, 9 are rigidly secured to the end members 4, 5 by means of screws 11.

In order to secure the two warp beam parts 2, 3 in a locked relation, a clamping means is provided within the area of overlap. To this end, the clamping means includes two welded-on abutments 12 and a wedge 13 which are mounted in the end of the narrower diameter, i.e. innermost, part 2. In addition, the clamping means includes a wedge-shaped clamping element 14 mounted on the abutments 12 and means for moving the clamping element 14 against the wedge 13 to expand the innermost part 3 radially against the outer warp beam part 2.

Figure 2:
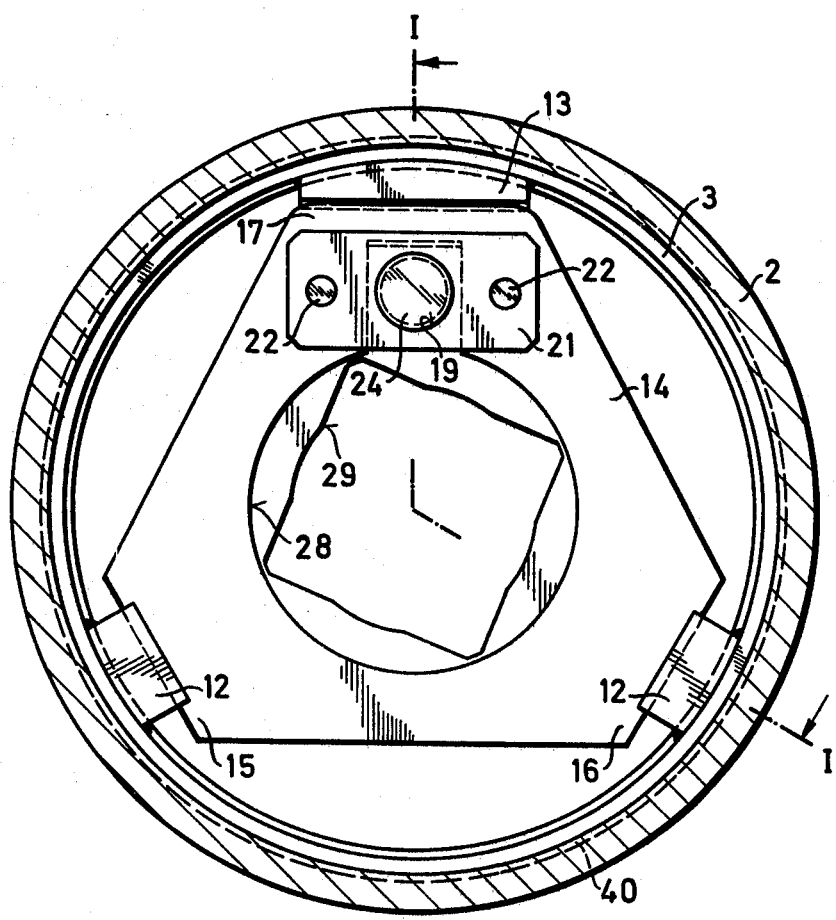
FIG. 2 illustrates a view taken on line II—II of FIG. 1.

Referring to FIG. 2, the clamping element 14 is in the form of a plate of substantially triangular shape and is oriented in a substantially radial manner relative to the warp beam 1. The plate 14 is mounted at two vertex areas 15, 16 in the abutments 12 which are provided with slots as shown to receive the plate 14. The remaining vertex area 17 is of wedge-shape to bear against the wedge 13 on the innermost warp beam part 3. In this way, a three-point mounting of the plate 14 on the part 3 is obtained.

The means for moving the clamping plate 14 includes a spindle 24 which is rotatably mounted within the warp beam parts 2, 3 and which passes through the plate 14 in threaded relation 6 to move the plate 14 relative to the wedge 13 to selectively tighten the plate 14 against the wedge 13 upon rotation of the spindle 24. In order to threadably secure the spindle 24 to the plate 14, a shaped element 21 having a screwthread 19 is mounted by means of pins 22 (e.g. two as shown) secured at the top, as viewed, of the plate 14 and the spindle 24 is provided with a screwthread 23 which threads into the element 21. As shown in FIG. 1, the element 21 has a stem portion which extends through the plate 14 and which has a slot to receive the plate 14. The plate 14, as shown in FIG. 2, is cut-out to permit passage of this stem portion. The terminal end of the spindle 24 shown at the right extends through a bore 25 in the end member 5 to terminate in a recess 26 in the flange 9. This terminal end also has an enlarged head formed by a welded on nut 27 which is disposed in the recess 26 to act as an abutment for the spindle 24.

In use, after the parts 2, 3 have been adjusted, the spindle 24 is tightened to bring the plate 14 substantially into a vertical position as shown in FIG. 1, so that the inner beam part 3 is expanded and pressed radially from within against the beam part 2. In this way, a non-positive engagement is provided between the parts 2, 3.

As shown in FIG. 2, the plate 14 has an internal passage 28 while the beam end members 4, 5 have passages 29 through which a square rod can be pushed for the warping of the beam 1 as is known.

Figure 3:
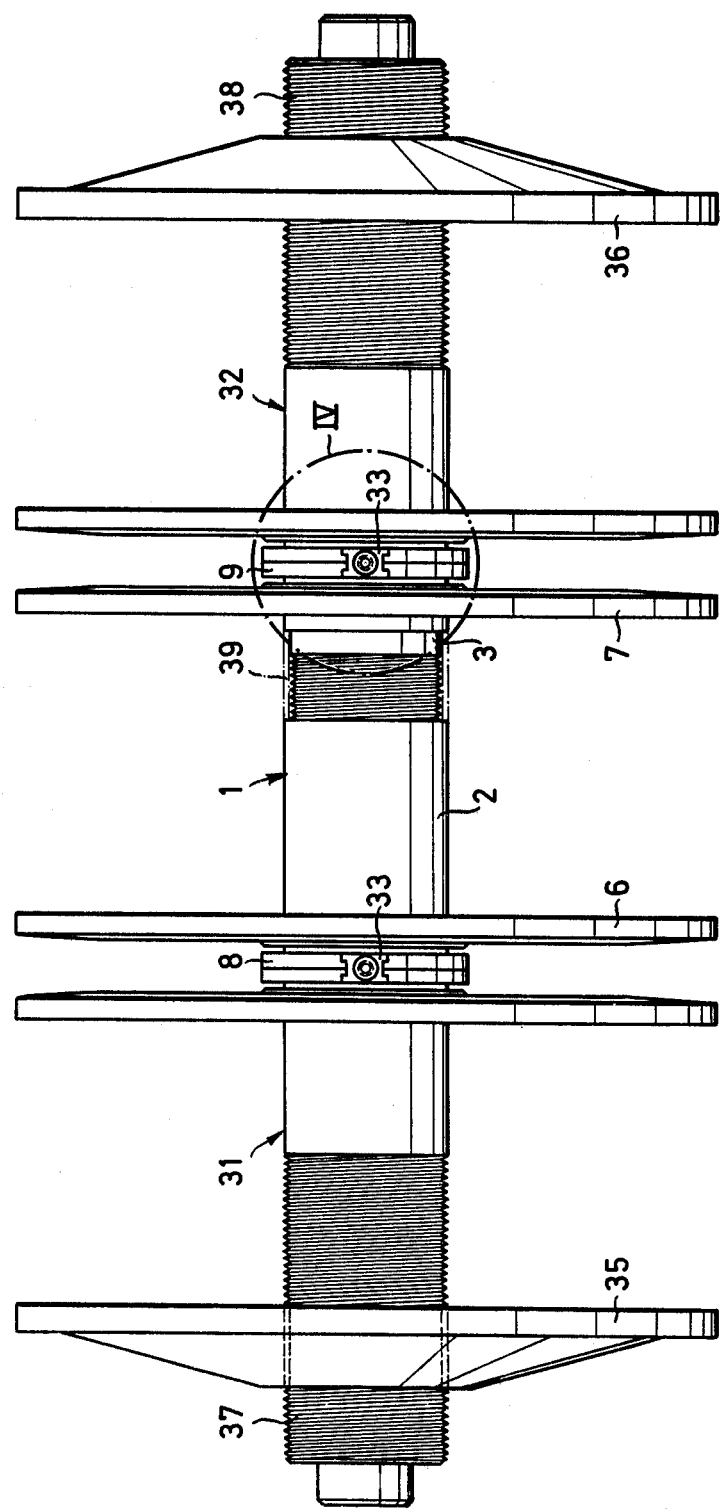
FIG. 3 illustrates the warp beam of FIG. 1 in use in a three-piece complete warp beam.

Referring to FIG. 3, the warp beam 1 of FIG. 1 forms the central portion of a complete warp beam comprising three discrete portions 31, 1, 32. These discrete portions 31, 1, 32 are so interconnected by means of wedges 33 as to rotate as a unit with one another.

Figure 4:
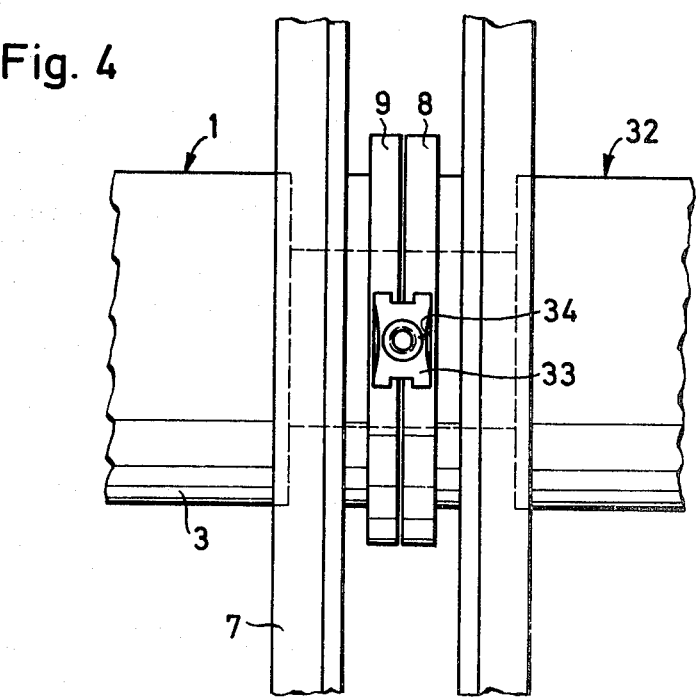
FIG. 4 illustrates a view to an enlarged scale of a detail of FIG. 3.

As shown in FIG. 4, the wedges 33 engage in corresponding recesses 34. Conveniently, the periphery of each bearing flange 8, 9 is formed with a number of recesses 34, so that a number of possibilities of interconnecting the beam portions with one another is available for the knotting or tying of the warp yarns.

Referring to FIG. 3, the flanges 6, 7 are disposed at both ends of the warp beam portion formed by the telescoping parts 2, 3; but in the case of the portions 31, 32, the outer flanges 35, 36 are disposed inwards of the beam ends 37, 38 so that the ends 37, 38 extend outwardly through the flanges 35, 36.

For diameter compensation, the beam member 3 has shell-like shims or the like 39 which are made e.g. of board (so-called half-shells) and are of the same outer dimensions as the part 2 to form a smooth continuous surface with the part 2.

As a variant of the invention, the warp beam tube parts 2, 3 can be engaged in one another and clamped together e.g. without any screwthread 40. The inner part 3 may also be expanded into clamping engagement with the outer part 2 in some other way, e.g. by a circular clamping plate which can be drawn into the end 42 of the inner beam part 3 (FIG. 1) and which has a conical contour. If required, the beam part 3 can be formed with one or more slots 43 (shown in chain lines in FIG. 1). As another variant, in addition to the adjustment possible by means of the plate 14 and spindle 24, for instance, the flange 6 which is on the left in FIG. 1 can be so disposed on the outside of the beam part 2 as to be adjustable and locatable as indicated by the flanges 35, 36 in FIG. 3.

What is claimed is:

1. A warp beam comprising
   at least two telescopically engaging elongated rigid tubular parts disposed in overlapping relation to define a common area of overlap and an elongated cylindrical surface to receive warp threads thereon;
   a flange attached to each of the parts at opposite ends of the thread receiving surface; and
   clamping means mounted within the innermost part of said parts for pressing said innermost part radially outwardly against the outermost part within said area of overlap, said clamping means being located between the flanges.

2. A warp beam comprising
   at least two telescopically engaging tubular parts disposed in overlapping relation to define a common area of overlap; and
   clamping means mounted within the innermost part of said parts for pressing said innermost part radially outwardly against the outermost part within said area of overlap, said clamping means including a triangularly shaped radially disposed plate within said area of overlap, means mounting said plate for pivotal movement, and means for pivotally moving said plate to expand the innermost part of said parts radially against the outermost part of said parts.

3. A warp beam as set forth in claim 1 wherein said clamping means includes a wedge mounted on the innermost part of said parts, a substantially radially disposed plate having a wedge-like surface bearing on said wedge, and a spindle rotatably mounted within said parts and passing through said plate in threaded relation to move said plate relative to said wedge to selectively tighten said plate against said wedge upon rotation of said spindle.

4. A warp beam as set forth in claim 3 which further comprises a bearing flange secured to one end of said innermost part, said flange having a recess therein; and wherein said spindle has a terminal portion mounted within said flange and in said recess.

5. A warp beam as set forth in claim 3 wherein said plate is a triangularly shaped plate.

6. A warp beam as set forth in claim 5 which further includes a pair of abutments in said innermost part mounting two vertices of said plate thereon.

7. A warp beam as set forth in claim 1 wherein said innermost part extends beyond said outermost part and which further comprises a plurality of shell-like shims over said innermost part, said shims having the same outer dimensions as said outermost part to form a smooth continuous outer surface with said outermost part.

8. A warp beam comprising
   at least two telescopically engaging parts disposed in overlapping relation to define a common area of overlap; and
   clamping means pressing said parts together radially within said area of overlap, said clamping means including a wedge mounted on said innermost part, a substantially radially disposed plate having a wedge-like surface bearing on said wedge, a bearing flange secured to one end of said innermost part and having a recess therein, and a spindle rotatably mounted within said parts and passing through said plate in threaded relation to move said plate relative to said wedge to selectively tighten said plate against said wedge upon rotation of said spindle, said spindle having a terminal portion mounted within said flange and in said recess.

9. A warp beam comprising
   at least two telescopically engaging parts disposed in overlapping relation to define a common area of overlap with the innermost part extending beyond the outermost part;
   clamping means pressing said parts together radially within said area of overlap; and
   a plurality of shell-like shims over said innermost part and having the same outer dimensions as said outermost part to form a smooth continuous outer surface with said outermost part.

10. A warp beam comprising
    at least two telesocpically engaging tubular parts disposed in overlapping relation to define a common area of overlap; and
    clamping means mounted within the innermost part of said parts for pressing said innermost part radially outwardly against the outermost part within said area of overlap, said clamping means including a triangularly shaped plate within said area of overlap and having a three-point mounting on said innermost part and means for pivoting said plate to expand the innermost part of said parts radially against the outermost part of said parts.

* * * * *